United States Patent [19]

Bratton et al.

[11] Patent Number: 4,793,429

[45] Date of Patent: Dec. 27, 1988

[54] DYNAMIC VEHICLE-WEIGHING SYSTEM

[75] Inventors: Raymond J. Bratton, Delmont, Pa.; Frederick G. Geil, Annapolis; John H. Thompson, Severna Park, both of Md.; Karl F. Schoch, Jr., Penn Hills, Pa.

[73] Assignee: Westinghouse Electric Corp., Pittsburgh, Pa.

[21] Appl. No.: 184,308

[22] Filed: Apr. 20, 1988

[51] Int. Cl.[4] .............................................. G01G 3/14
[52] U.S. Cl. ...................................... 177/210 C; 177/1
[58] Field of Search ................................ 177/1, 210 C

[56] References Cited

U.S. PATENT DOCUMENTS

| | | | |
|---|---|---|---|
| 3,565,195 | 2/1971 | Miller et al. | 177/210 C |
| 3,678,378 | 7/1972 | Trott et al. | 177/210 C X |
| 3,782,486 | 1/1974 | Kuhn et al. | 177/210 C |
| 3,875,481 | 4/1975 | Miller et al. | 177/210 C X |
| 3,895,421 | 7/1975 | Miller | 177/210 C X |
| 4,266,263 | 5/1981 | Haberl et al. | 177/210 C X |
| 4,461,363 | 7/1984 | Loy | 177/1 |
| 4,512,431 | 4/1985 | Bloomfield | 177/210 C X |
| 4,520,885 | 6/1985 | Jeffrey | 177/210 C |
| 4,581,677 | 4/1986 | Hruby et al. | 177/210 C X |

Primary Examiner—George H. Miller, Jr.

[57] ABSTRACT

A system for weighing a vehicle in motion is disclosed. One or more piezoelectric weight sensors produce charge outputs in response to the weight of a vehicle passing over the sensors. A charge amplifier converts the sensor outputs to a voltage level. A peak voltage detector detects the peak voltage, which represents the sum of all sensor outputs. The peak voltage is then converted to a weight value using the thickness sensitivity of the piezoelectric material.

10 Claims, 1 Drawing Sheet

DYNAMIC VEHICLE-WEIGHING SYSTEM

FIELD OF THE INVENTION

The invention relates generally to vehicle-weighing devices and, more specifically, to vehicle-weighing devices using piezoelectric materials.

BACKGROUND OF THE INVENTION

Present systems for weighing vehicles generally use a treadle system, that requires the truck or other vehicle being weighed to come to a complete stop so that the vibrations and bouncing of the treadle will damp out; otherwise, the recorded weight may be erroneous. This is an example of static weighing. Less time would be spent during weighing if the system were dynamic, i.e. if the vehicle could be weighed while in motion, as well as in stopped condition. Besides the need for a dynamic vehicle-weighing system, a need exists for a less expensive, as well as portable, vehicle-weighing system.

Dynamic vehicle-weighing systems are also known using four load cells, located at the corners of a plate called a bridge. This system is recessed into the pavement. While the system can measure weight dynamically, current technology requires speeds lower than 10 MPH to enable enough time duration for the weight on the bridge to stop the bouncing and vibration motions. The mechanical complexity of this measurement system is lower than that of treadle systems, but still high.

The two applications of greatest interest lie in weigh stations, where a fixed installation capable of measuring and recording the absolute weight of each axle while the vehicle is under way would be used, and in roadway locations, where a portable system easily applied across a roadway would register an overweight condition only. In other words, an alarm condition would be set at the appropriate weight, such that any vehicle passing over the weighing device and weighing in excess of the appropriate weight would trigger the alarm. Advantageously, such a system also could function in a static weighing mode as well.

SUMMARY OF THE INVENTION

The present invention utilizes a weight sensor having a layer of piezo-composite material disposed between two electrodes in a circuit to produce a charge signal in response to pressure applied to the sensor. When a vehicle drives over the sensor, the weight of the vehicle produces a charge signal from the sensor, which is converted by a charge amplifier to a voltage signal. A peak voltage detector detects the peak voltage level, whether derived from the charge produced by a single sensor or as a sum from the charges of multiple sensors connected in parallel. Processing means then converts the peak voltage to a weight value based upon the thickness sensitivity of the piezo-composite material.

DETAILED DESCRIPTION OF THE INVENTION

Figure 1:
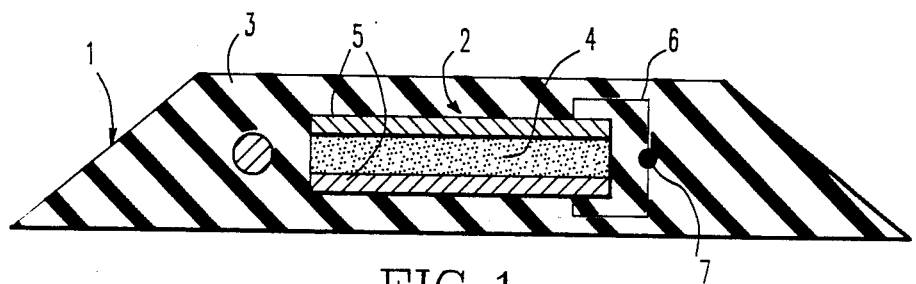
FIG. 1 is a cross-section elevation view showing the principal components of the sensor of the weighing system according to the present invention.

With reference to FIG. 1, the sensor used in the invention is shown in cross-section in its preferred embodiment. Weighing strip 1 generally comprises a weight sensor 2 encased in encapsulant 3. Sensor 2 may be considered to be an electroded tile, including a piezoelectric material 4 and two electrodes 5. A single sensor 2 may be long enough to satisfy the weighing requirements of a vehicle (e.g., long enough to accommodate all wheels on an axle), or several smaller sensors 2 may be utilized to weigh a vehicle. The piezoelectric material may include, for example, a piezo-composite including lead titanate powder, or a piezoelectric polymer such as polyvinylidene fluoride. A signal conductor 6 carries the signal generated by the sensor to external circuitry via charge signal output 7.

Fabrication of the weighing strip is carried out according to well known fabrication procedures. The lower half of sensor 2 is first encapsulated with a durable resilient elastomer capable of sustaining adverse roadway exposures. Wires are attached to electrodes 5, and the composite pads are fixtured for placing anchoring cable 8 in position, and for finishing the encapsulation.

When a uniform pressure P is applied, weight (which corresponds to P) may be calculated based upon the electrical response of sensor 2 to P. Pressure P generates an electric field E, which is a function of the applied pressure and the piezoelectric constant $g_{33}$ according to the following equation:

$$E = g_{33} \times P$$

The resulting voltage, therefore, is:

$$V = g_{33} \times P \times t$$

where $V = E \times t$, and $t$ = thickness of piezoelectric material 4.

The capacitance C of sensor 2 can be calculated as:

$$C = e \times L \times W / t,$$

where e is the dielectric constant of piezoelectric material 4. The charge displacement q generated by pressure P in sensor 2 can now be expressed as:

$$q = C \times V = g_{33} \times e \times P \times t \times L \times W / t = d_{33} \times P \times L \times W$$

where $d_{33}$ is the thickness sensitivity of piezoelectric material 4, and is equal to $g_{33} \times e$.

Expressing charge displacement q in terms of force (weight) and $d_{33}$:

weight $= P \times L \times W$, and therefore:

$q = d_{33} \times$ weight, or weight $= q/d_{33}$.

Note that this last expression is independent of area and thickness. This means that sensor 2 may be very thin, and that a given weight generates the same charge displacement whether it is spread out or concentrated.

Charge q can be measured with a charge amplifier, which generates a voltage out proportional to charge in. The charge is caused to flow from one electrode 5 to the other by presenting a near short circuit (low impedance) to sensor 2. This short circuit prevents voltage from occurring between the electrodes 5, which in turn prevents unexcited sections of sensor 2 from diminishing the available generated charge since for those sections, if $V=0$, $q=C \times V=0$.

Figure 2:
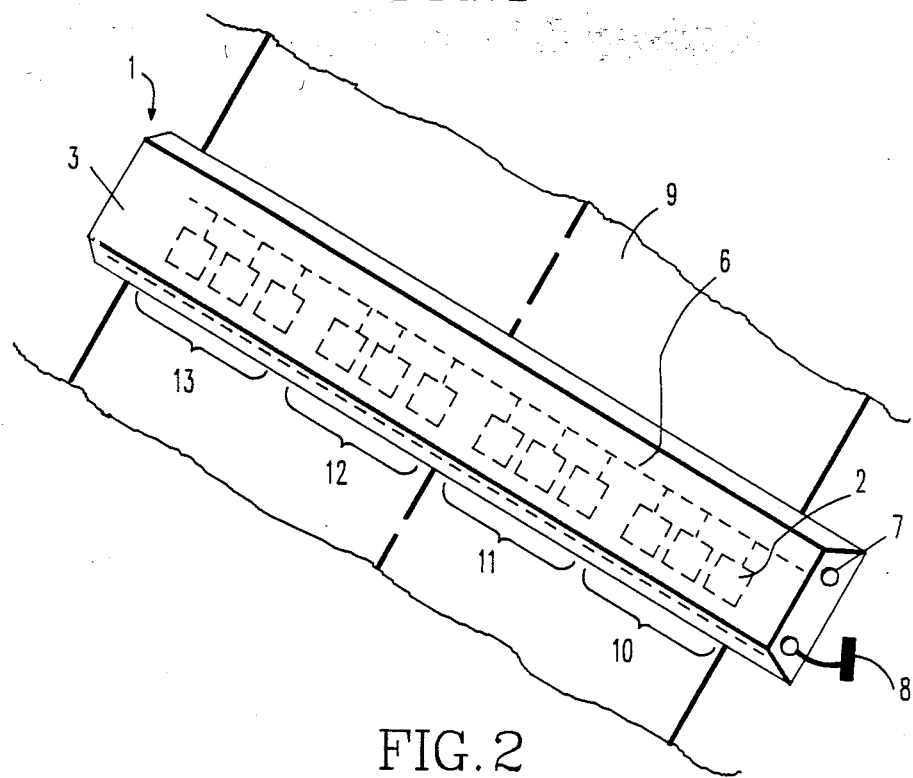
FIG. 2 is a plan view of the weighing system in its roadway use embodiment.

If several sensors 2 are connected in parallel several excited by weight and several unexcited, the contributions from each excited sensor adds to the total charge measured (see FIG. 2). Since unexcited sensors add nothing, the total weight is measured based upon the total charge signal at charge signal output 7. The same analysis shows that the weight at any excited sensor need not be uniform, although the $d_{33}$ does need to be uniform within each sensor, and constant and uniform for all sensors. Different $d_{33}$ values could be accommodated, but summing of sensor outputs would be complicated by the necessity to incorporate a new variable into the processing algorithm.

Analysis shows that the optimum weight signal detection means is via a charge amplifier system. As previously noted, this system effectively places a short circuit across the sensor so that the charge displaced during weighing is transferred through the charge amplifier input connection. When a charge amplifier is used, the weight measured is independent of area being compressed as well as of the thickness of the strip; in other words, the piezoelectric layer may be as thin as is practical, and the contribution of each wheel is additive, even if they are multiple in number and unequal in weight.

Figure 3:
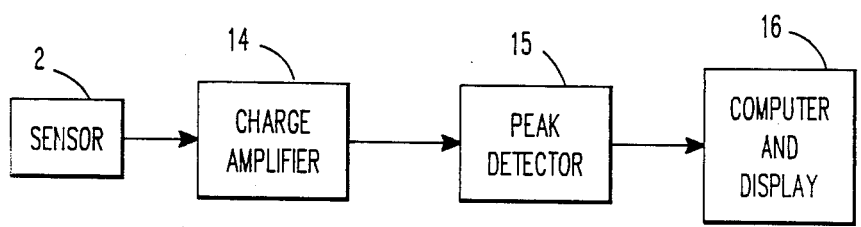
FIG. 3 is a simplified block diagram of the circuit used in conjunction with the invention.

A block diagram of the signal processing system for the vehicle-weighing system is shown in FIG. 3. The signal processing system consists of a charge amplifier 14, a peak detector 15, and a computer 16 (e.g. a microprocessor) with display or with separate display. All components are conventional, and chosen to fit the operating needs of the system and user. The charge amplifier 14 converts the incoming signal from the sensor 2 to a voltage, and the peak detector 15 captures the maximum voltage value and outputs a peak voltage value to the computer 16. The computer 16 is arranged to process the peak voltage value in accordance with the aforesaid equations to convert the peak voltage value to a weight per axle ratio and to reset the peak detector 15. If gross vehicle weight is desired, computer 16 may also be arranged to process the peak voltage value by, e.g., summing a specified number of consecutive axle weight signals to convert the peak voltage value to a gross vehicle weight. Data can be recorded on the computer screen, printed out, or stored on disk.

FIG. 2 illustrates a representative weighing strip applied to a roadway 9 that could be used for truck weighing applications in which the wheels on the load axles (e.g. 4 wheels per axle) excite four sections 10, 11, 12, 13 each having three sensors 2 located to correspond with, for example, the "footprints" of e.g. four wheels on an axle. Of course, where fewer wheels are present, fewer sections of sensors 2 could be used. Furthermore, the designation of three sensors 2 per wheel footprint is merely a preferred embodiment; fewer or more sensors 2 per sensor section also could be used, so long as the axle or wheel weight is completely borne by a sensor or sensors. The generated charge flows are additive, and the actual weight measured corresponds to the peak voltage at the output of the charge amplifier 14. This peak voltage corresponds to the condition of 100 per cent support by the sensors 2 of weight to be measured; lower than peak readings correspond to the condition of part of the weight being supported off of the sensor area (e.g. rolling of a wheel onto or off of the sensor 2). Each sensor 2 must therefore be at least as wide as the tire "footprint" area, on the order of one foot wide for a typical wheel. The desirability of a thin sensor is evident, in that the thinner the sensor, the less bouncing is produced as the tire rolls onto the sensor, and, therefore, the more accurate the measurement.

Since the vehicle axle weight (or gross vehicle weight, if desired) in the preferred embodiment corresponds simply to the maximum charge, the measurement is independent of vehicle speed, and a ballistic-hold type of charge measurement device may be used. For example, a simple diode in series with a capacitor connected between the signal line and ground in parallel with a reset switch functions to hold the charge on the capacitor. The diode prevents discharge of the capacitor back toward the circuit. The reset switch, of course, discharges the capacitor to ground when the measured charge is to be cleared.

Various modifications of the invention discussed in the foregoing description will become apparent to those skilled in the art. All such variations that basically rely on the teachings through which the invention has advanced the art are properly considered within the spirit and scope of the invention.

We claim:

1. An electronic system for weighing vehicles, comprising;
    at least one sensor section arranged to receive pressure force from an object such as a vehicle including at least one weight sensor, said weight sensor including a layer of piezoelectric material disposed between two electrodes, said weight sensor arranged to output a charge signal to a charge signal output in response to pressure applied thereto; and
    means for converting said charge signal to a weight value according to the relationship $$weight = q/d_{33},$$

where q is said charge signal and $d_{33}$ is the thickness sensitivity of said piezoelectric material, said means for converting charge to weight including means for converting said charge signal to a voltage signal, means for detecting the peak voltage of said voltage signal, and means for converting said peak voltage to a weight value.

2. An electronic system for weighing vehicles as claimed in claim 1, wherein said piezoelectric material includes a piezo-composite.

3. An electronic system for weighing vehicles as claimed in claim 1, wherein said piezoelectric material includes a piezoelectric polymer.

4. An electronic system for weighing vehicles as claimed in claim 1, wherein said weight sensor is encapsulated in resilient encapsulant material.

5. An electronic system for weighing vehicles as claimed in claim 1, wherein said means for converting charge to voltage is a charge amplifier.

6. An electronic system for weighing vehicles as claimed in claim 1, further comprising;
    a plurality of said sensor sections, each including a plurality of said weight sensors, all said weight sensors being electrically connected in parallel to produce a total charge signal representing the sum of charge signals from each said weight sensor at said charge signal output.

7. An electronic system for weighing vehicles as claimed in claim 4, including means for measuring the weight of a vehicle having at least one pair of wheels on an axle, said wheels creating a footprint area for each wheel, said means for measuring comprising an arrangement of said weight sensors such that at least one sensor section is disposed at each footprint area of a vehicle to be weighed.

8. An electronic system for weighing vehicles, comprising:
a plurality of sensor sections arranged to receive pressure force from an object such as a vehicle, each said sensor section including a plurality of weight sensors, each said weight sensor including a layer of piezoelectric material disposed between two electrodes such that each said weight sensor produces a charge signal in response to pressure applied thereto, each said weight sensor being electrically connected in parallel with one another to produce a total charge signal representing the sum of all said charge signals from said weight sensors at a common charge signal output; said weight sensors encapsulated in resilient encapsulating material; and
means for converting said charge signal to a weight value according to the relationship $$\text{weight} = q/d_{33},$$

where
q is said total charge signal and $d_{33}$ is the thickness sensitivity of said piezoelectric material, said means for converting charge to weight including a charge amplifier for converting said total charge signal to a voltage signal, means for detecting the peak voltage of said voltage signal, and means for converting said peak voltage to a weight value.

9. A method for weighing a vehicle, comprising the steps of:
providing a weighing device including a weight sensor having a layer of piezoelectric material disposed between two electrodes such that said weight sensor produces a charge signal at a charge signal output in response to pressure applied thereto, and locating said weight sensor so that it can be traversed by a wheel of a vehicle;
traversing said weighing device with a vehicle to produce a charge signal at said charge signal output; and
converting said charge signal to a weight value according to the relationship $$\text{weight} = q/d_{33},$$

where
q is said charge signal, and $d_{33}$ is the thickness sensitivity of said piezoelectric material, said means for converting charge to weight including means for converting said charge signal to a voltage signal, means for detecting the peak voltage of said voltage signal, and means for converting said peak voltage to a weight value.

10. A method for weighing a vehicle, comprising the steps of:
providing a weighing device including a plurality of weight sensors each having a layer of piezoelectric material disposed between two electrodes such that each said weight sensor produces a charge signal in response to pressure applied thereto, said weight sensors being electrically connected in parallel with one another to produce a total charge signal representing the sum of all said charge signals from said weight sensors at a common charge signal output, and locating said weight sensors so that they can be traversed by the wheels of a vehicle;
traversing said weighing device with a vehicle to produce a total charge signal at said charge signal output; and
converting said total charge signal to a weight value according to the relationship $$\text{weight} = q/d_{33},$$

where
q is said total charge signal, and $d_{33}$ is the thickness sensitivity of said piezoelectric material, said means for converting charge to weight including means for converting said total charge signal to a voltage signal, means for detecting the peak voltage of said voltage signal, and means for converting said peak voltage to a weight value.

* * * * *